United States Patent
Kim et al.

(10) Patent No.: US 7,688,411 B2
(45) Date of Patent: Mar. 30, 2010

(54) MULTI-DOMAIN LIQUID CRYSTAL DISPLAY DEVICE

(75) Inventors: Do-Sung Kim, Gyeongsangbuk-Do (KR); Byung-Koo Kang, Gyeongsangbuk-Do (KR); Young-Mi Tak, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 718 days.

(21) Appl. No.: 11/475,925

(22) Filed: Jun. 28, 2006

(65) Prior Publication Data

US 2007/0152939 A1    Jul. 5, 2007

(30) Foreign Application Priority Data

Dec. 30, 2005   (KR) ...................... 10-2005-0136117

(51) Int. Cl.
    *G02F 1/1335* (2006.01)
(52) U.S. Cl. ........................ 349/121; 349/129; 349/141
(58) Field of Classification Search ........................ None
    See application file for complete search history.

(56) References Cited

U.S. PATENT DOCUMENTS

| | | | |
|---|---|---|---|
| 6,636,289 B2 * | 10/2003 | Yoo et al. | 349/141 |
| 2005/0140897 A1 * | 6/2005 | Kim | 349/141 |
| 2005/0253989 A1 * | 11/2005 | Chen et al. | 349/141 |

* cited by examiner

*Primary Examiner*—Sung H Pak
*Assistant Examiner*—Chad H Smith
(74) *Attorney, Agent, or Firm*—McKenna Long & Aldridge LLP

(57) ABSTRACT

Provided is a multi-domain liquid crystal display device capable of improving a viewing angle by decreasing a color shift. The multi-domain LCD device includes a first substrate, a second substrate, a plurality of gate lines provided in one direction on the first substrate, a plurality of data lines provided substantially perpendicular to the plurality of gate lines to define a plurality of pixel regions including a first area and a second area, a common electrode and a pixel electrode which generate a parallel electric field within the first area to improve luminance, a common electrode and a pixel electrode which generate a parallel electric field within the second area to decrease color shift, and a liquid crystal layer formed between the first substrate and the second substrate.

21 Claims, 7 Drawing Sheets

MULTI-DOMAIN LIQUID CRYSTAL DISPLAY DEVICE

This application claims the benefit of Korean Patent Application No. 2005-136117, filed Dec. 30, 2005, which is hereby incorporated by reference for all purposes as if fully set forth herein.

BACKGROUND OF THE INVENTION

1. Field of the Invention

The present invention relates to a liquid crystal display device, and more particularly to a multi-domain liquid crystal display device.

2. Discussion of the Related Art

A twisted nematic liquid crystal display device, which is widely used as a flat panel display device with high picture quality and low power consumption, has viewing angle limitations. This is due to the refractive anisotropy of liquid molecules. That is, the liquid crystal molecules are all oriented in the same direction parallel to the plane of a substrate, when a voltage is applied to a liquid crystal display panel, are all supposed to be oriented almost perpendicular to the plane of the substrate.

A great deal of research has recently gone into a In-Plane Switching (IPS) mode liquid crystal display device that overcomes the viewing angle limitation by enabling the liquid molecules to be almost parallel to the plane of the substrate.

FIG. 1 is plan view showing a pixel of the IPS mode liquid crystal display device and FIG. 1B is a cross-sectional view taken along I-I' line of FIG. 1A.

As shown in FIGS. 1 and 2, a gate line 1 and a data line 3 are provided respectively in a row and in a column on a substrate to define a pixel area. There exists an array of N×M pixels, which result from crossings of the N gate line 1 with the M data line 3, on the actual liquid crystal display device because, but only a single pixel is shown in FIG. 1 for the sake of explanation.

A thin film transistor 9 including a gate electrode 1a, an active layer 5 source electrode 2a, and a drain electrode 2b are provided at the crossing of the gate line 1 with the data line 3. The gate electrode 1a and the source and drain electrodes 2a and 2b are connected to the gate line 1 and the data line 3, respectively. A gate insulating layer 8 is deposited over the whole substrate.

A common line 4 is provided in parallel to the gate line 1 within the pixel area. At least a pair of electrodes which switches the molecules, i.e. a common electrode 6 and a pixel electrode 7 are provided in parallel with the date line 3. The common electrode 6 is formed together with the gate line 1 and connected to the common line 4. The pixel electrode 7 is formed together with the source and drain electrodes 2a and 2b and is connected to the drain electrode 2b of the thin film transistor 9. A passivation layer 11 is formed over the whole substrate, covering the source and drain electrodes 2a and 2b. A pixel electrode line 14, which is formed having a overlap region with the common line 4 and connected to the pixel electrode 7, forms a storage capacitor (Cst) with the insulating layer 8 in between.

A black matrix 21 preventing light from propagating into the thin film transistor 9, the gate line 1 and the data line, and a color filter 23 generating color are formed on a second substrate 20. Alignment layers 12a and 12b, which determine the initial alignments of the molecules, are coated on the opposing surfaces of the first and second substrates, respectively.

A liquid crystal layer 13 is formed between the first substrate 10 and the second substrate 20. Reflective indices of light propagated through the liquid crystal layer 13 is controlled by applying an voltage to the common electrode 6 and the pixel electrode 7.

In the above-described structure of the IPS mode liquid crystal display device, liquid crystal molecules within the liquid crystal layer 13 are aligned based upon the alignments of the alignment layers coated on the opposing surfaces of the first and second substrates 10 and 20 when the voltage is not applied, but are switched in parallel to the substrates and thus aligned in parallel to the gate line 1 when the voltage is applied between the common electrode 6 and the pixel electrode 7.

FIGS. 2A and 2B illustrate the concept of the IPS mode driving the liquid crystal display device having the above-described structure. FIGS. 2A and 2B show how the liquid crystal molecules are driven when the voltage is not applied between the common electrode 6 and the pixel electrode 7 and when the voltage is applied between the common electrode 6 and the pixel electrode 7, respectively.

As shown in FIG. 2A, the liquid crystal molecules within the liquid crystal layer are aligned along the rubbing direction (indicated as an arrow "↑" in FIGS. 2A and 2B) of the alignment layer coated on the opposing surfaces of the first and second substrates when the voltage is not applied in the liquid crystal display device, thus generating a black line along the alignment direction on a screen.

As shown in FIG. 2B, the liquid crystal molecules allow light to be propagated along an electric field generated between the common electrode 6 and the pixel electrode 7 when the voltage is applied between the common electrode 6 and the pixel electrode 7.

The switching of the liquid crystal molecules at all times on the same plane within the liquid crystal layer 13 in the related IPS mode liquid crystal display device makes it possible to makes a gray level smaller in the up-down direction and in the right-left direction, thus increasing a viewing angle.

However, a color shift takes places due to a birefringence characteristic of the liquid crystal, based on the direction to view the liquid crystal. Especially, a yellow shift and a blue shift take places in the short axis direction and in the long axis direction, respectively.

SUMMARY OF THE INVENTION

Accordingly, the present invention is directed to a multi-domain liquid crystal display device that substantially obviates one or more of the problems due to limitations and disadvantages of the related art.

An advantage of the present invention is to provide a multi-domain liquid crystal display device capable of improving a viewing angle by decreasing a color shift.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and accordance with the purpose of the present invention, as embodied and broadly described a multi-media liquid crystal display unit including a first substrate, a second substrate, a plurality of gate lines provided in one direction on the first substrate, a plurality of data lines provided substantially perpendicular to the plurality of gate lines to define a plurality of pixel regions including a first area and a second area, a common electrode and a pixel electrode which generate a parallel electric field within the first area to improve luminance, a common electrode and a pixel electrode which generate a parallel electric field within the second area to decrease color shift, and a liquid crystal layer formed between the first substrate and the second substrate.

According to another aspect of the present invention, there is provided a liquid crystal display device including a first substrate, a second substrate, a plurality of gate lines provided in one direction on the first substrate, a plurality of data lines provided substantially perpendicular to the plurality of gate lines to define a plurality of pixels, a common electrode and a pixel electrode formed on the plurality of pixels and generate a parallel electrical field, and a liquid crystal layer formed between the first substrate and the second substrate, wherein slopes of the common electrode and the pixel electrode are gradually increased with respect to a rubbing direction as the common electrode and the pixel electrode extend in a direction from a center of the pixel.

According to another aspect of the present invention, there is provided a liquid crystal display device including a first substrate, a second substrate, a plurality of gate lines provided in one direction on the first substrate, a plurality of date lines substantially perpendicular to the plurality of gate lines to define a plurality of pixel regions, a common electrode formed on the whole pixel region, a pixel electrode generating a parallel electric field in cooperation with the common electrode, and a liquid crystal layer formed between the first substrate and the second substrate, wherein a slope of the pixel electrode with respect to a rubbing direction is gradually increased as the pixel electrode extends in a direction away from a center of the pixel region.

The present invention provides the liquid crystal display device capable of improving image quality by improving the luminance and reducing the color shift. That is, the liquid crystal display device employs an electrode structure in which the luminance can be maximized and the color shift minimized. Thus, the luminance improvement and the color shift prevention can be accomplished at the same time.

The basic concept behind the present invention is to form the multi-domains with slopes of the common electrode and the pixel electrode with respect to the rubbing direction being differentiated from those of the other common electrode and pixel electrode. That is, the common electrode and the pixel electrode having a first slope contribute mainly to the luminance improvement and the common electrode and the pixel electrode having a second slope contribute mainly to the viewing angle improvement (the color shift prevention). The principle behind the present invention, if the common electrode and the pixel electrode are formed on the same substrate and generate the parallel electric field, may be applied to the IPS mode and the FFS mode alike.

The design of the gradual increase of the slope of the electrodes with respect to the rubbing direction according to the present invention makes it possible to minimize disclination lines occurring on the boundaries between the domains.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1A:
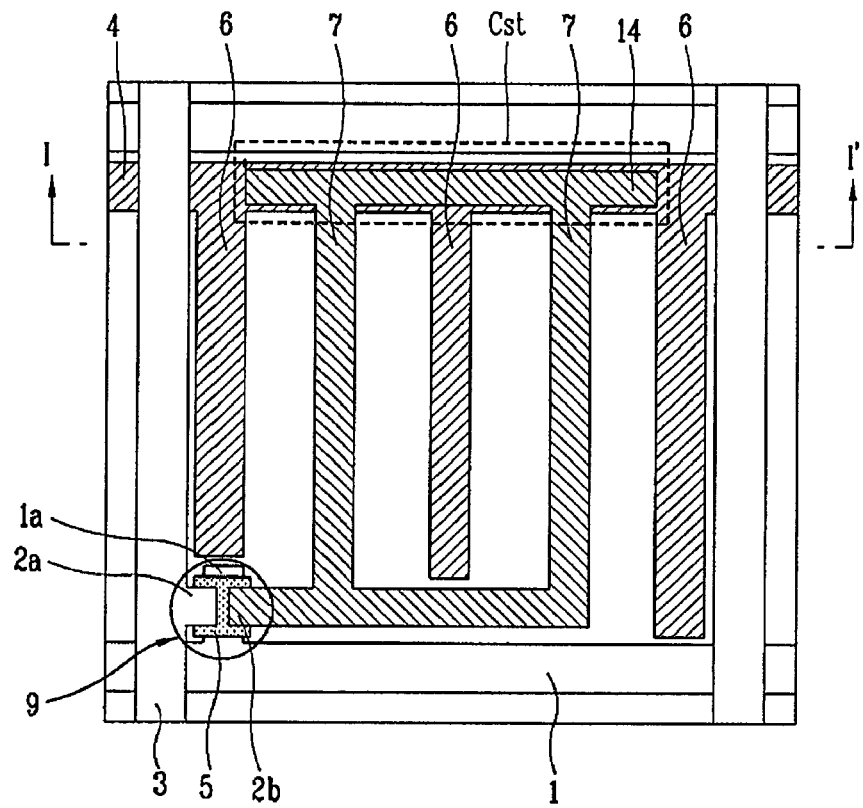
FIG. 1A is a plan drawing showing a related IPS mode liquid crystal display device.
Figure 1B:
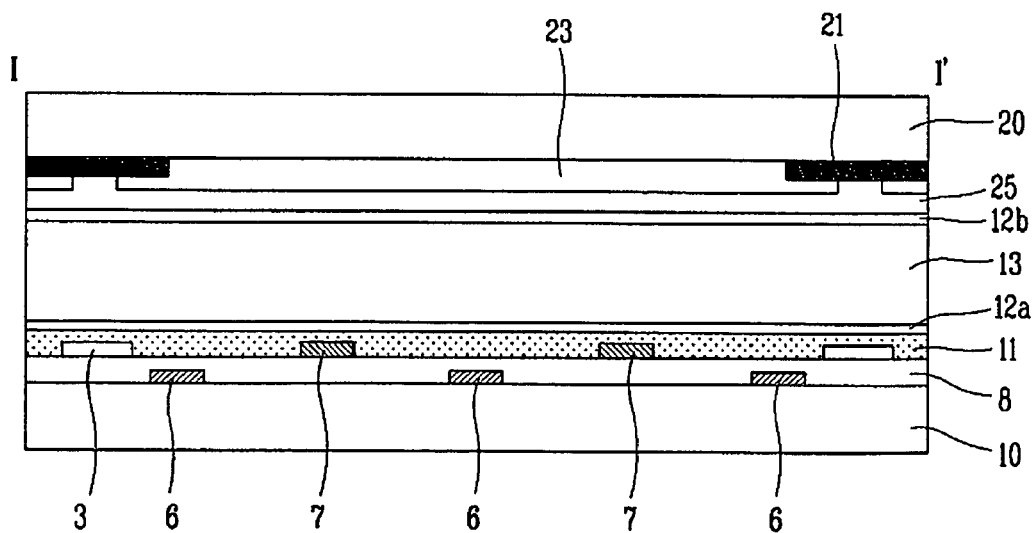
FIG. 1B is a cross-sectional drawing taken along I-I' line of FIG. 1A.
Figure 2A:
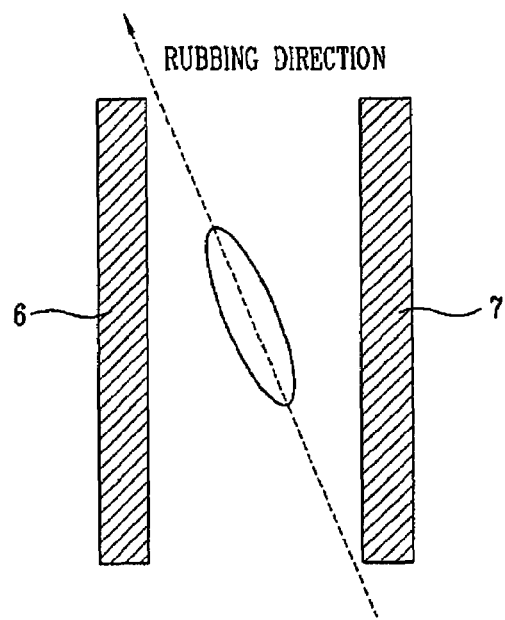
FIG. 2A is a drawing showing an initial state of liquid crystal molecules when the voltage is not applied between the common electrode 6 and the pixel electrode 7.
Figure 2B:
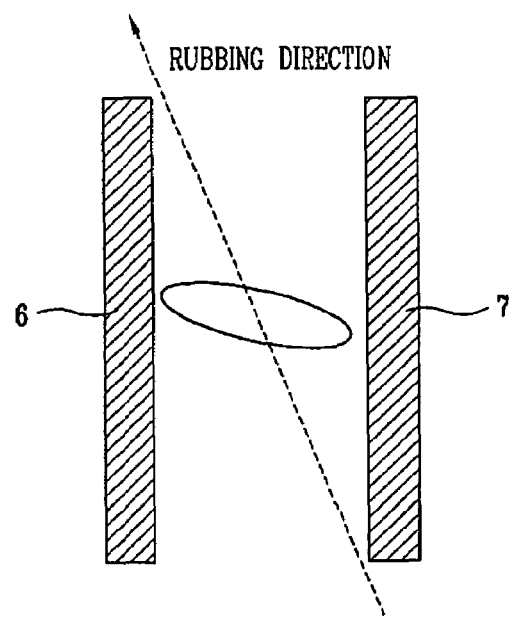
FIG. 2B is a drawing showing how the liquid crystal molecules are driven when the voltage is applied between the common electrode 6 and the pixel electrode 7.
Figure 3:
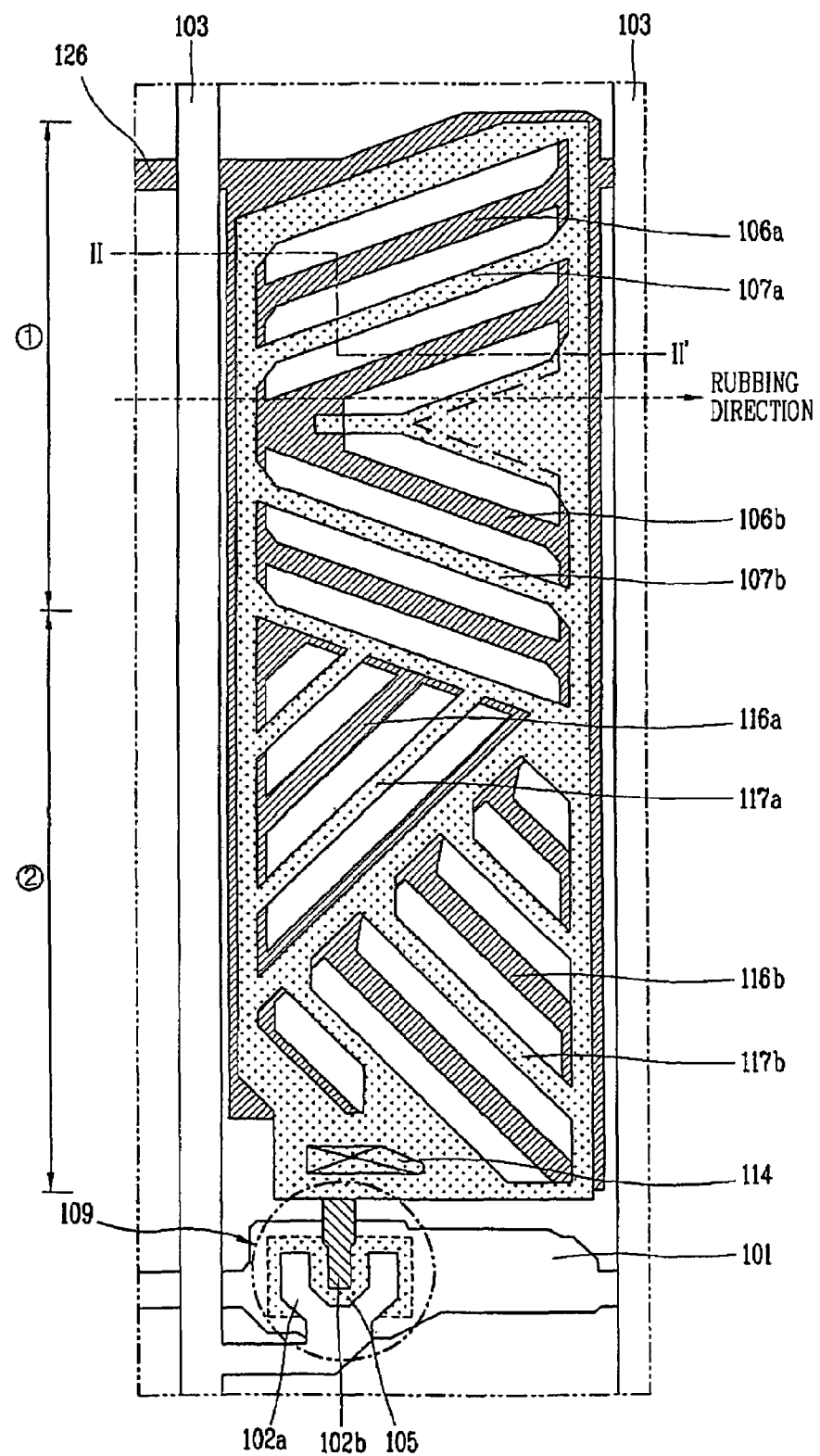
FIG. 3 is a plan drawing showing a pixel of the liquid crystal display device according to an embodiment of the present invention.
Figure 4:
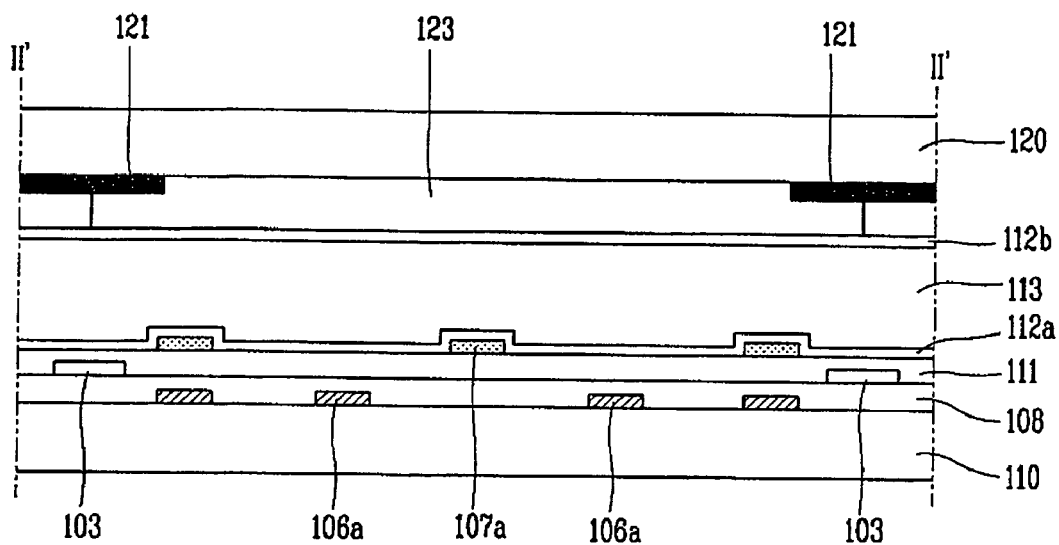
FIG. 4 is a cross-sectional drawing taken along II-II' line of FIG. 3.

FIG. 3 is a plan drawing showing a pixel of a liquid crystal display device according to an embodiment of the present invention. FIG. 4 is a cross-sectional drawing taken along II-II' line of FIG. 3.

As shown in FIGS. 3 and 4, a pixel area in a liquid crystal display device 100 according to the present invention is defined by a gate line 101 provided in a first direction on a first substrate 110 and a date line 103 crossing the gate line 101.

A switching device 109 is formed at a crossing of the gate line 101 and the data line 103. The switching device 109 includes a gate electrode having a overlap region with the gate line 101, a semiconductor layer 105 formed on top of the gate electrode, and a source electrode 102a and a drain electrode 102b which are spaced apart and formed on the semiconductor layer 105.

The common electrodes 106a, 106b, 116a, and 116b and the pixel electrodes 107a, 107b, 117a, and 117b, which generate parallel electric fields, are formed in the pixel areas. The pixel areas are divided into a first area (1) in which the common electrodes 106a and 106b have a first slope θ1 with respect to a rubbing direction and a second area (2) in which the common electrodes 116a and 116b and the pixel electrodes 117a and 117b have a second slope θ2 with respect to the rubbing direction. The rubbing direction is substantially parallel to the gate line 101.

The common electrodes 106a and 106b and the pixel electrodes 107a and 107b forming a second domain are provided on the first area (1) and the common electrodes 106a and 106b include a first common electrode 106a and a second common electrode 106b which are symmetrical with respect to the rubbing direction. The pixel electrodes 107a and 107b include a first pixel electrode 107a and a second pixel electrode 107b which are symmetrical with respect to the rubbing direction. At this point, the common electrodes 106a and 106b and the pixel electrodes 107a and 107b have a first slope θ1 ranging from about 5 degrees to 20 degrees with respect to the rubbing direction.

The common electrodes 116a and 116b and the pixel electrodes 117a and 117b are provided on the second area (2) forming a second domain. The common electrodes 116a and 116b include a first electrode 116a and a second electrode 116b which are symmetrical with respect to the rubbing direction. The pixel electrodes 117a and 117b include a first pixel electrode 117a and a second pixel electrode 117b which are symmetrical with respect to the rubbing direction. At this point, the common electrodes 116a and 116b and the pixel electrodes 117a and 117b have a second slope θ2 of about 45 degrees with respect to the rubbing direction. Also, an electric field occurring between the first common electrode 116a and the first pixel electrode 117a is at an angle of about 90 degrees with the electric field occurring between the second common electrode 116b and the second pixel electrode 117b.

The common electrodes 106a, 106b, 116a, and 116b are formed on the same layer as a gate line 101. Also, a protecting layer is formed over the whole area of a substrate, covering the data line 103 and the pixel electrodes 107a, 107b, 117a, and 117b are formed on the protecting layer. At this point, the pixel electrodes 107a, 107b, 117a, and 117b are electrically connected to the drain electrode 102b through a drain contact hole 114. The pixel electrodes 107a, 107b, 117a, and 117b may be formed with a transparent material such as an indium tin oxide (ITO) or an indium zinc oxide (IZO)

A black matrix 121 block preventing light from being propagated through and a color filter 123 are formed on the second substrate 120. A first alignment layer and a second alignment layer, which determine initial alignments of liquid crystal molecules, are coated on the opposing surfaces of the first substrate and the second substrate. A liquid crystal layer 113 is formed between the first and second alignment layers.

In the liquid crystal display device 100 according to the embodiment of the present invention, the first area (1) improves the luminance and the second area (2) minimizes the color shift by offsetting abnormal light caused by birefringence character of the liquid crystal. In the first area (1), the common electrodes 106a and 106b and the pixel electrodes 107a and 107b have the first slope θ1 ranging from about 5 degrees to 20 degrees with respect to the rubbing direction to maximize the luminance. In the second area (2), the common electrodes 116a and 116b and the pixel electrodes 117a and 117b have the second slope θ2 of about 45 degrees, so that the liquid crystal molecules are arranged substantially perpendicular to each other. This makes it possible to minimize the color shift, resulting in improved viewing angle.

Figure 5:
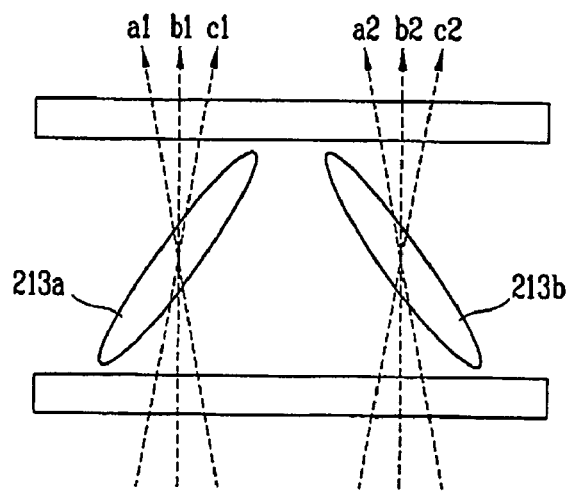
FIG. 5 is a drawing showing the concept for conpesating viewing angle in two domains.

More specifically, in the case of two domains where the liquid crystal molecules are symmetrical, as shown in FIG. 5, an a1 birefringence value of a first liquid crystal molecule is offset by an a2 birefringence value of a second liquid crystal molecule which is arranged as opposed to the first molecule, resulting in the a1 birefringence value being "0." Also, a c1 birefringence value is offset by a c2, resulting in the c1 birefringence value being "0." This makes it possible to minimize the color shift due to the birefringence characteristic of the liquid crystal and prevent deterioration in image quality due to the viewing angle. When a symmetrical angle of the liquid crystal molecule is "45 degrees," the birefringence value to be offset is maximized.

Figure 6:
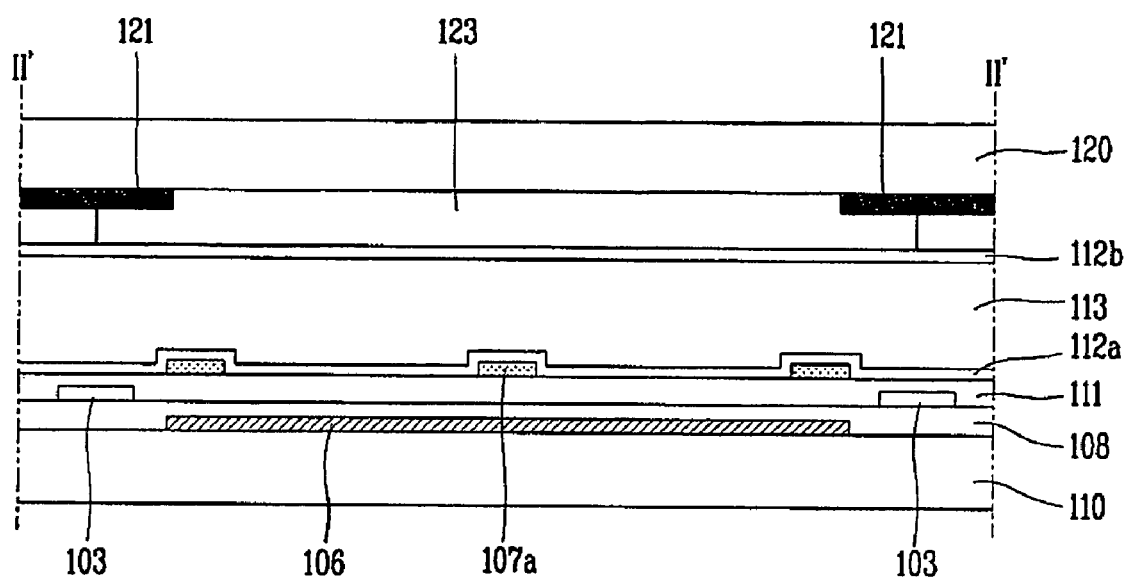
FIG. 6 is a cross-sectional drawing showing another embodiment of the present invention.

As shown in FIG. 6, the common electrode 106 may be formed over the whole area of the pixel area. At this point, the common electrode 106 has to be formed with a transparent conductive material. FIG. 6 is a cross-sectional drawing taken along the II-II' line of FIG. 4 showing that the common electrode 106 is formed over the whole area of the pixel area. The configuration of FIG. 6 is similar to FIG. 4 except for the common electrode.

The common electrodes 116a and 116b formed on the second area (2) may be provided above and below the first area (1), respectively.

Figure 7:
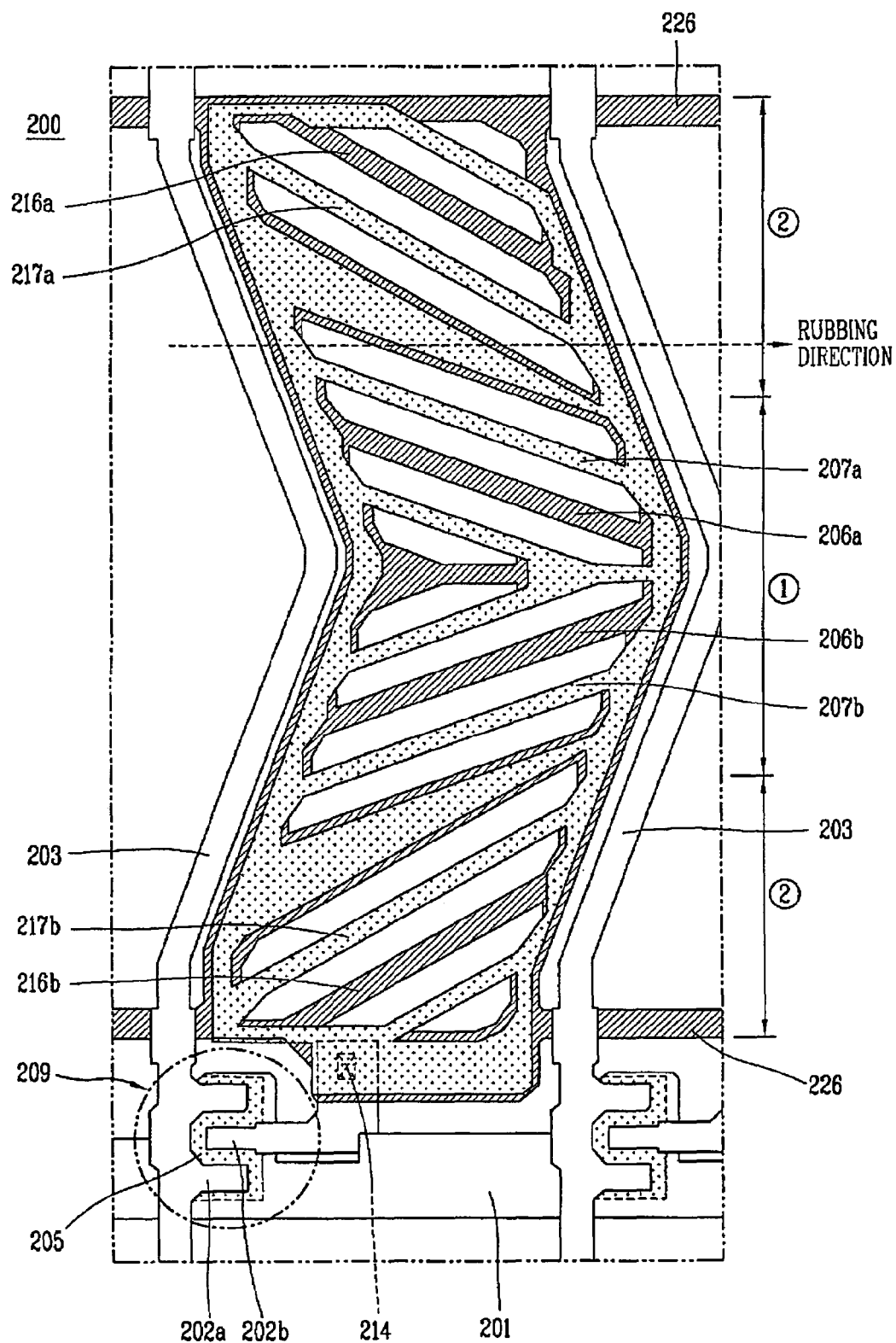
FIG. 7 is a plan drawing showing a pixel according to another embodiment of the present invention.

FIG. 7 illustrates another embodiment of the present invention in which the second area (2) is separately provided above and below the first area. All elements are the same as those embodiment previously discussed above (as shown in FIG. 4), except for the configuration of the second area. Descriptions of the same elements are omitted.

As shown in FIG. 7, in the multi-domain liquid crystal display device 200 according to an embodiment of the present invention, a single pixel is defined by a gate line 201 and a data line 203. The data line 203 may be formed to have a bent shape.

In the single pixel, common electrodes 206a and 206b and pixel electrodes 207a and 207b are symmetrical with respect to a rubbing direction formed in parallel to the gate line 201. The pixel area is divided into a first area (1) where a first slope θ1 with respect to the rubbing direction ranges from about 5 degrees to 20 degrees and a second area where the common electrodes 216a and 216b and the pixel electrodes 217a and 217b have a second slope θ2 of about 45 degrees with respect to the rubbing direction, respectively, and are provided above and below the first area (1), respectively.

That is, the common electrodes 216a and 216b formed in the second area (2) include a first common electrode 216a which may be provided above the first area (1) and a second common electrode 216b which may be provided below the first area (1). At this point, the pixel electrodes 217a and 217b formed in the second area (2) include a first pixel electrode 217a provided above the first area (1) and a second pixel electrode 217b provided below the first area (1).

The common electrodes 206a, 206b, 216a, and 216b may be formed on the whole area of a first substrate 210. In this case, the common electrodes 206a, 206b, 216a, and 216b are formed with a transparent conductive material.

In the liquid crystal display device, as above described, according to the embodiment of the present invention, the common electrode and the pixel electrode which have a slope of about 45 degrees with respect to the rubbing direction are provided above and below the first area (1), respectively and are symmetrical with respect to the rubbing direction to enjoy the same benefits as in the earlier embodiment.

The liquid crystal display device, as shown in FIGS. 4 to 7, has an advantage of providing a high luminance and a high image quality. However, a disclination line due to formation of the multi-domains can occur on the boundaries between the domains, i.e., the boundaries between the first and second areas.

A black matrix (BM) pattern (not shown) may be formed on the boundaries between the first and second areas to prevent light from leaking through the disclination lines.

The gradual increase in the slope with respect to the orientation, as the common electrodes and pixel electrodes go away from a center of the pixel area, may prevent the disclination lines, instead of forming the BM pattern.

Figure 8:
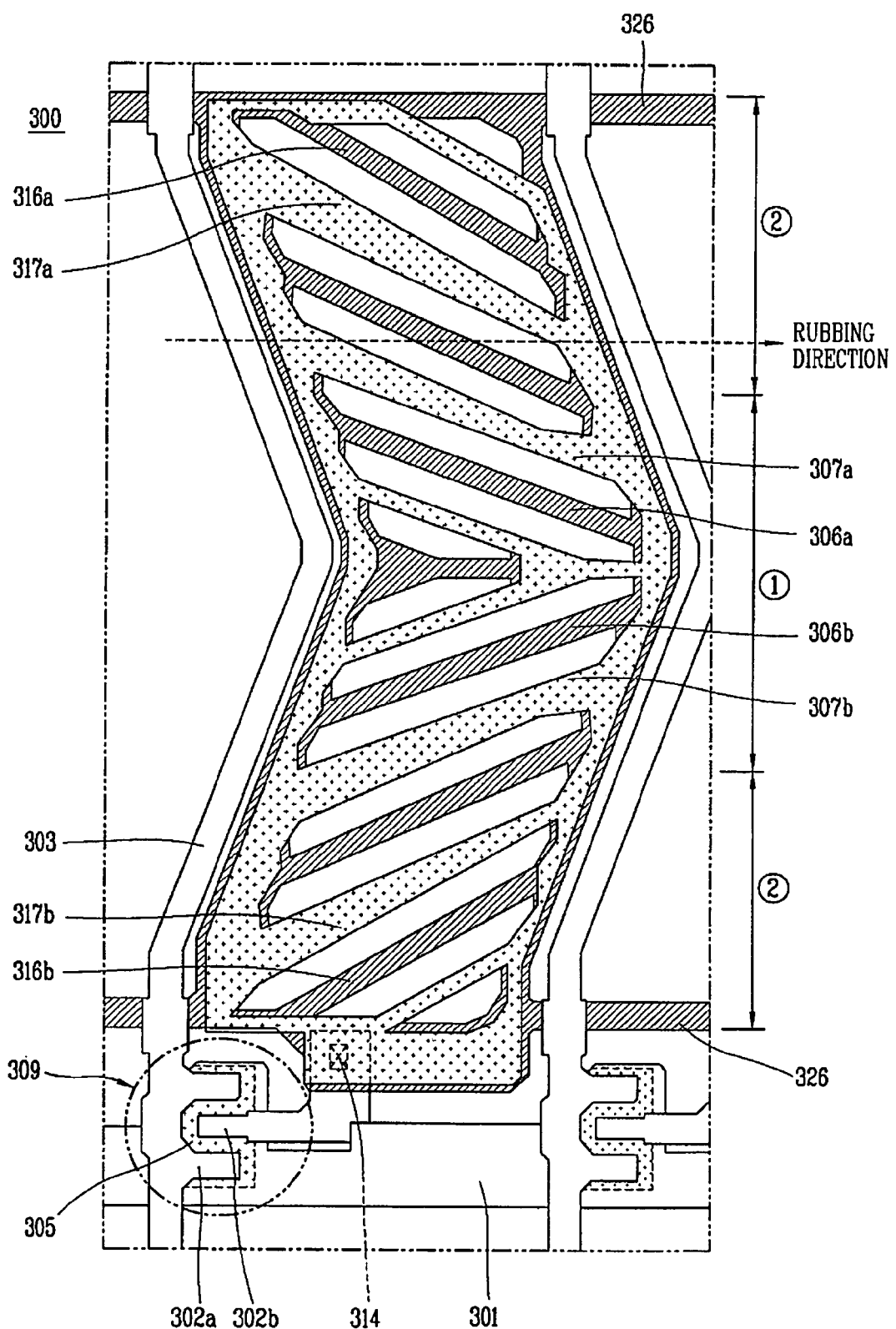
FIG. 8 is a plan drawing showing a pixel according to another embodiment of the present invention.

FIG. 8 illustrates another embodiment of the present invention which prevents the occurrence of the disclination lines. FIG. 8 is similar to the previously described embodiments (as shown in FIGS. 4 and 8), except for structures of the common electrodes and the pixel electrodes. Descriptions of the similar elements are omitted.

As shown in FIG. 8, in a liquid crystal display device 300, a pixel area is defined by a gate line 301 and a data line 303. The pixel area is divided into a first area (1) and a second area (2).

A first common electrode 306a and a first pixel electrode 307a, whose slopes are gradually increased with respect to a rubbing direction as the common electrode and the pixel electrode go away from a center of the pixel area, are formed in the first area. A second common electrode 306b and a second pixel electrode 307b, whose slopes are gradually increased with respect to the rubbing direction as the common electrode and the pixel electrode go in a direction away from a center of the pixel area, are formed in the second area.

The first common electrode 306a and the first pixel electrode 307a which are formed in the first area (1) and the second common electrode 306b and the second pixel electrode 307b which are formed in the second area (2) are symmetrical with respect to the center of the pixel area in the rubbing direction. The slopes θ of the first common electrode 306a and the first pixel electrode 307a and the second common electrode 306b and the second pixel electrode 307b with respect to the rubbing direction do not exceed about 45 degrees. That is, the slopes are gradually increased from about 0 degrees to 45 degrees as the first and second common electrodes and the first and second pixel electrodes go in a direction away from the center of the pixel area.

The common electrodes 306a and 306b may be formed over the whole surface of first substrate 310. In this case, the common electrodes 306a and 306b are formed with transparent conductive material such as an indium tin oxide (ITO) or an indium zinc oxide (IZO).

The liquid crystal display device as described above with respect to embodiments of the present invention, does not have distinctive boundaries between domains, thus preventing the occurrence of thee disclination lines. This makes it unnecessary to form a BM pattern on the boundaries between the domains to shield the disclination lines, thus providing a benefit in terms of an opening ratio.

The present invention, as above described, improves viewing angles by forming within one pixel area the common electrodes and the pixel electrodes which have respective different symmetrical slopes with respect to the rubbing direction, with the multi-domain being formed. Furthermore, the present invention can effectively decrease the color shift by enabling some of the common electrodes and the pixel electrodes to have symmetrical slopes of about 90 degrees with respect to the rubbing direction and also improve the luminance by adjusting the symmetrical slopes of the common electrodes and the pixel electrodes with respect to the rubbing direction.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multi-domain liquid crystal display device comprising:
   a first substrate;
   a second substrate;
   a plurality of gate lines provided in one direction on the first substrate;
   a plurality of data lines provided substantially perpendicular to the plurality of gate lines to define a plurality of pixel regions including a first area and a second area;
   a common electrode and a pixel electrode which generate an electric field parallel to the first and second substrates within the first area to improve luminance;
   a common electrode and a pixel electrode which generate an electric field within the second area to decrease color shift;
   an alignment layer over the first substrate, the alignment layer being rubbed; and
   a liquid crystal layer formed between the first substrate and the second substrate,
   wherein the rubbing direction of the alignment layer is substantially parallel to the gate line in the first area and the second area of the pixel region, the common electrode in the first area includes a first common electrode and a second common electrode disposed respectively in the angle of about 5 degrees to about 20 degrees with respect to the rubbing direction and the pixel electrode in the first area includes a first pixel electrode and a second pixel electrode disposed respectively in the angle of about 5 degrees to about 20 degrees with respect to the rubbing direction so that the first common electrode and the first pixel electrode are respectively symmetric to the second common electrode and the second pixel electrode with respect to the rubbing direction,
   wherein the common electrode in the second area includes a third common electrode and a fourth common electrode disposed respectively in the angle of about 45 degrees with respect to the rubbing direction and the pixel electrode in the second area includes a third pixel electrode and a fourth pixel electrode disposed respectively in the angle of about 45 degree with respect to the rubbing direction so that the third common electrode and the third pixel electrode are respectively symmetric to the fourth common electrode and the fourth pixel electrode with respect to the rubbing direction.

2. The multi-domain liquid crystal display device according to claim 1, wherein the second area is separately provided above and below the first area.

3. The multi-domain liquid crystal display device according to claim 2, wherein the first common electrode and the first pixel electrode of the second area are provided above the first area.

4. The multi-domain liquid crystal display device according to claim 2, wherein the first common electrode and the first pixel electrode of the second area are provided below the first area.

5. The multi-domain liquid crystal display device according to claim 2, wherein the data line has a bent shape.

6. The multi-domain liquid crystal display device according to claim 1, wherein the second area is provided below the first area.

7. The multi-domain liquid crystal display device according to claim 6, further comprising a black matrix pattern formed on boundaries between the first and second areas.

8. The multi-domain liquid crystal display device according to claim 1, wherein the pixel electrodes of the first and second areas are made of a transparent conductive material.

9. The multi-domain liquid crystal display device according to claim 1, wherein the common electrodes of the first and second areas are formed over the whole pixel region.

10. The multi-domain liquid crystal display device according to claim 9, wherein the common electrode is made of a transparent conductive material.

11. The multi-domain liquid crystal display device according to claim 9, wherein the pixel electrode of the first area includes a first pixel electrode and a second pixel electrode which form two domains that are symmetrical with respect to the rubbing direction.

12. The multi-domain liquid crystal display device according to claim 11, wherein the first and second pixel electrodes of the first area have a slope ranging from about 5 degrees to 30 degrees with respect to the rubbing direction.

13. The multi-domain liquid crystal display device according to claim 9, wherein the pixel electrode of the second area includes a first pixel electrode and a second pixel electrode which form two domains that are symmetrical and have a slope of about 45 degrees with respect to a rubbing direction.

14. A multi-domain liquid crystal display device comprising:
   a first substrate;
   a second substrate;
   a plurality of gate lines provided in one direction on the first substrate;
   a plurality of data lines provided substantially perpendicular to the plurality of gate lines to define a plurality of pixels;
   a common electrode and a pixel electrode which generate an electric field parallel to the first and second substrates within a first area to improve luminance;
   a common electrode and a pixel electrode which are formed within the pixel and generate a parallel electric field;
   an alignment layer over the first substrate, the alignment layer being rubbed; and
   a liquid crystal layer formed between the first substrate and the second substrate,
   wherein slopes of the common electrode and the pixel electrode within the pixel are gradually increased with respect to a rubbing direction as the common electrode and the pixel electrode extend in a direction away from a center of the pixel.

15. The multi-domain liquid crystal display device according to claim 14, wherein the rubbing direction of the alignment layer is substantially parallel to the gate line.

16. The multi-domain liquid crystal display device according to claim 15, wherein maximum slopes of the common electrode and the pixel electrode with respect to the rubbing direction are about 45 degrees.

17. The multi-domain liquid crystal display device according to claim 14, wherein the pixel electrode is made of a transparent conductive material.

18. A multi-domain liquid crystal display device comprising:
   a first substrate;
   a second substrate;
   a plurality of gate lines provided in one direction on the first substrate;
   a plurality of data lines provided substantially perpendicular to the plurality of gate lines to define a plurality of pixel regions;
   a common electrode provided over a whole area of the pixel region;
   a pixel electrode generating an electric field parallel to the first and second substrates in cooperation with the common electrode;
   a common electrode and a pixel electrode formed within the pixel region and generating a parallel electric field;
   an alignment layer over the first substrate, the alignment layer being rubbed; and
   a liquid crystal layer formed between the first substrate and the second substrate,
   wherein a slope of the pixel electrode in the pixel region is gradually increased with respect to a rubbing direction as the pixel electrode extends in a direction away from a center of the pixel region.

19. A multi-domain liquid crystal display device according to claim 18, wherein the rubbing direction of the alignment layer is substantially parallel to the gate line.

20. A multi-domain liquid crystal display device according to claim 19, wherein a maximum slope of the pixel electrode with respect to the rubbing direction is about 45 degrees.

21. A multi-domain liquid crystal display device according to claim 18, wherein the common and pixel electrodes are made of a transparent conductive material.

* * * * *